United States Patent [19]
Burg

[11] Patent Number: 5,324,092
[45] Date of Patent: Jun. 28, 1994

[54] FLYING TAILGATE FOR PICKUP TRUCKS

[76] Inventor: Donald E. Burg, 15840 SW. 84th Ave., Miami, Fla. 33157

[21] Appl. No.: 1,345

[22] Filed: Jan. 7, 1993

[51] Int. Cl.⁵ ............................................. B62D 35/00
[52] U.S. Cl. .................................. 296/180.1; 296/50; 296/51
[58] Field of Search ................ 296/180.1, 50, 51, 57.1

[56] References Cited

U.S. PATENT DOCUMENTS

| 4,475,759 | 10/1984 | Wine | 296/50 |
| 4,585,265 | 4/1986 | Mader | 296/180.1 |
| 4,930,834 | 6/1990 | Moore | 296/50 |

Primary Examiner—Robert R. Song
Attorney, Agent, or Firm—Robert J. Van Der Wall

[57] ABSTRACT

An improved tailgate or vane for pickup trucks that provides reduced aerodynamic resistance compared to the standard pickup truck tailgate. In one embodiment, it rotates, about upper pivots, from vertical to horizontal during acceleration of the pickup truck to provide a horizontal low aerodynamic resistance flying tail effect at high speeds. The improved tailgate can, in the preferred embodiment, be locked in a vertical orientation to accomplish a standard tailgate function as a retainer for the aft end of the bed of the pickup. It can be locked or fixedly attached in a non-vertical orientation to provide a vertical force on the rear of the pickup truck. It is intended that the improved tailgate can be easily attached or removed using either the standard tailgate attachment hardware supplied with the pickup truck or with new hardware supplied with the improved tailgate. It is also possible to incorporate one or more of the low resistance vanes into a frame of a standard tailgate to insure low aerodynamic resistance at high speeds. In all cases, it is preferred to use a grille in conjunction with the improved tailgate to prevent loss of small objects from the pickup truck's bed when the flying tailgate is open.

27 Claims, 6 Drawing Sheets

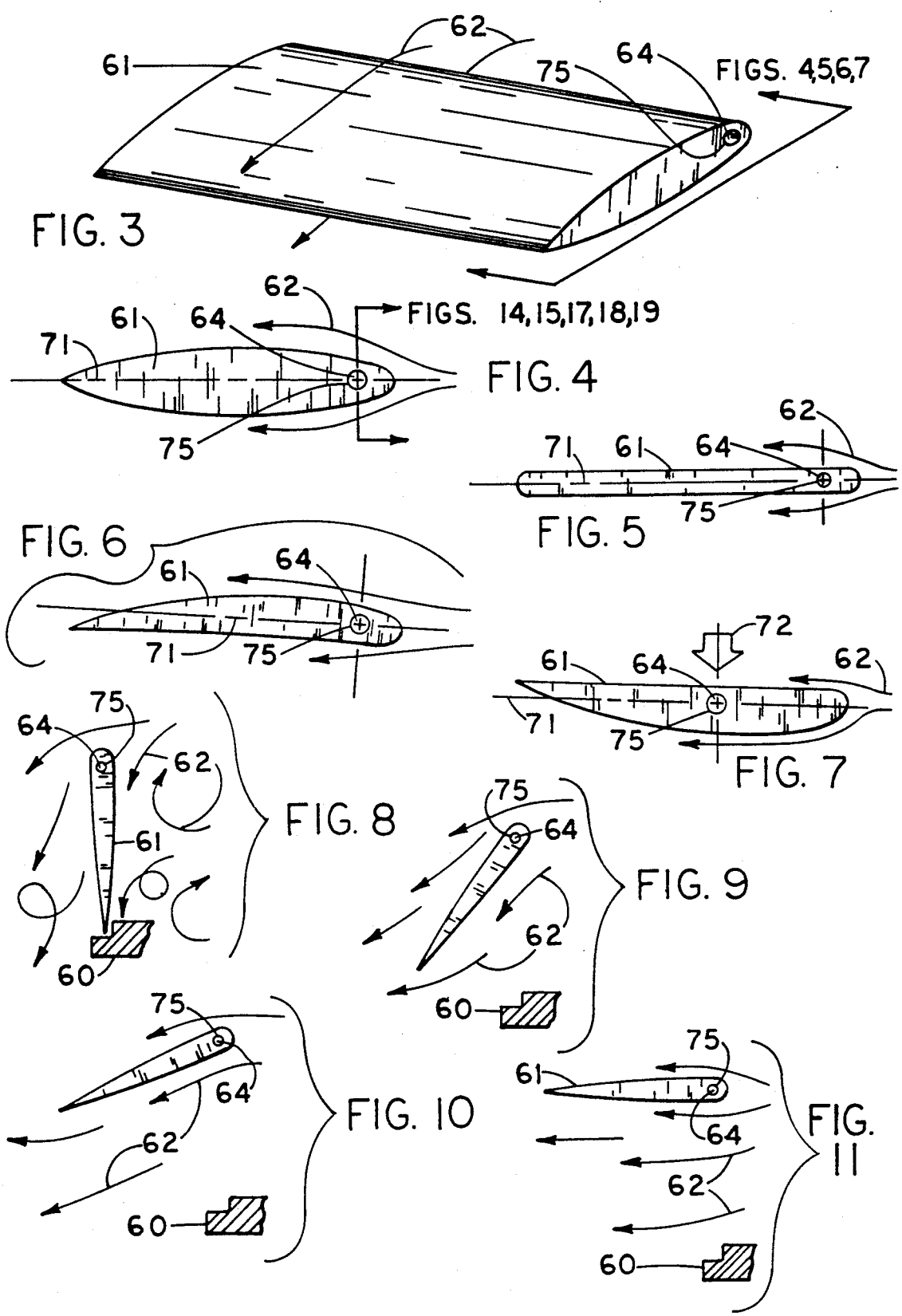

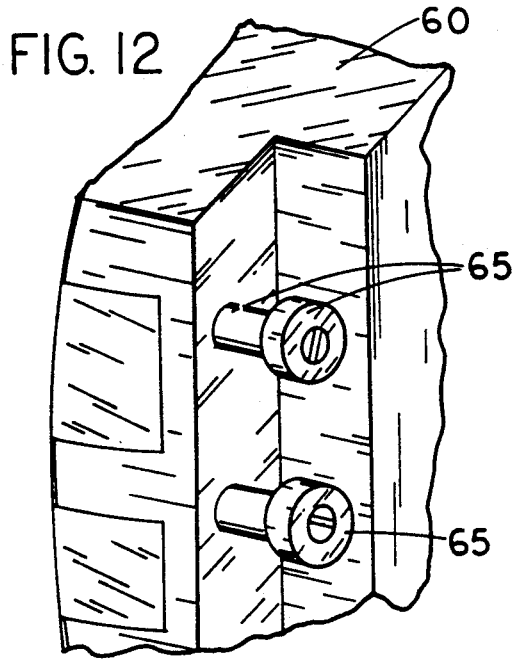
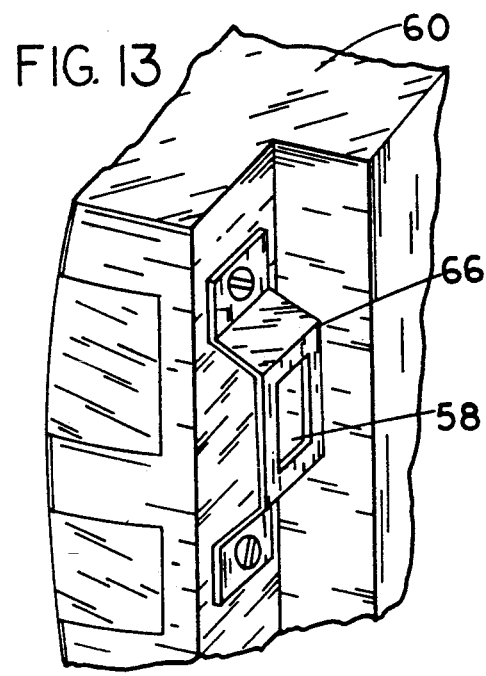
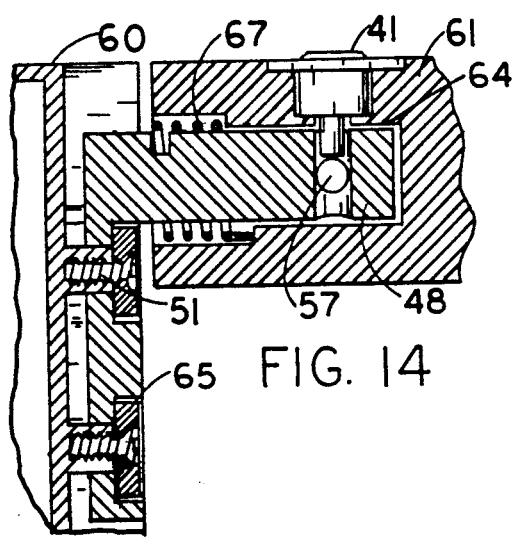
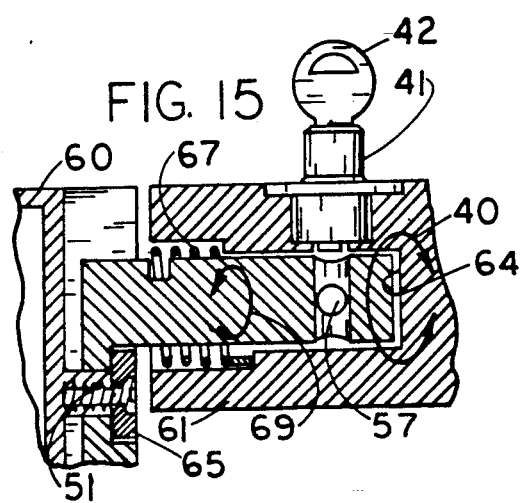
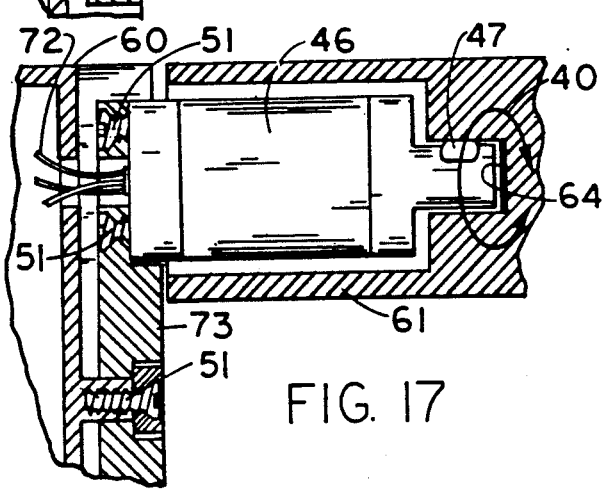
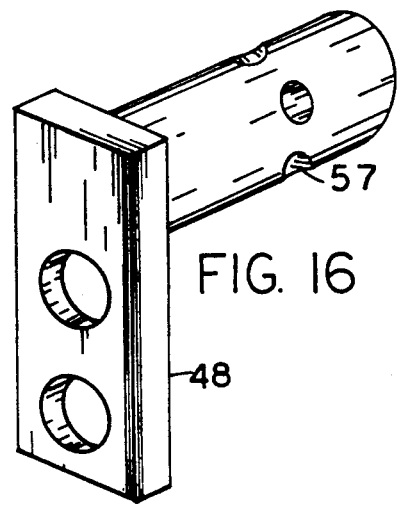

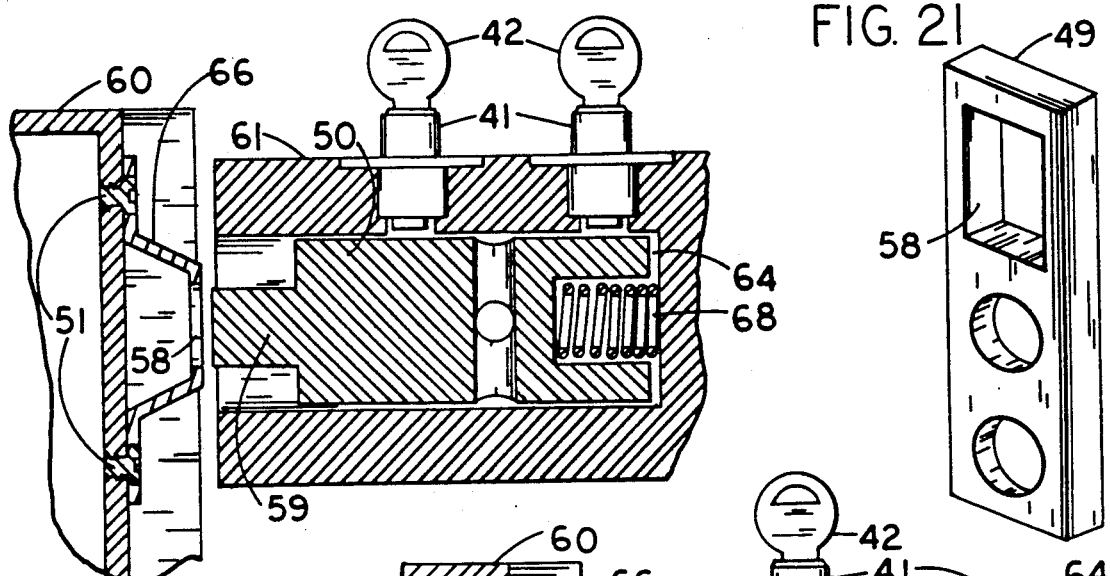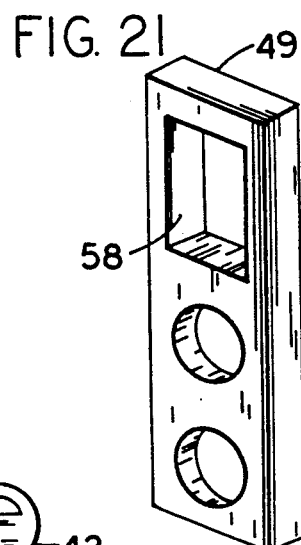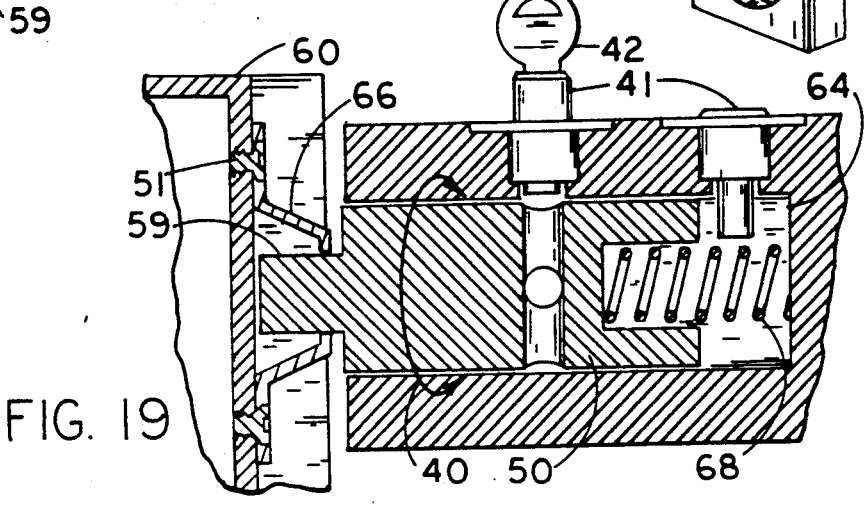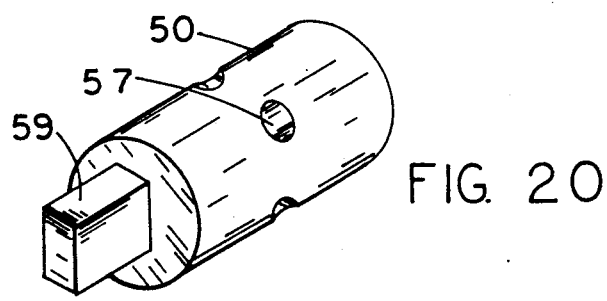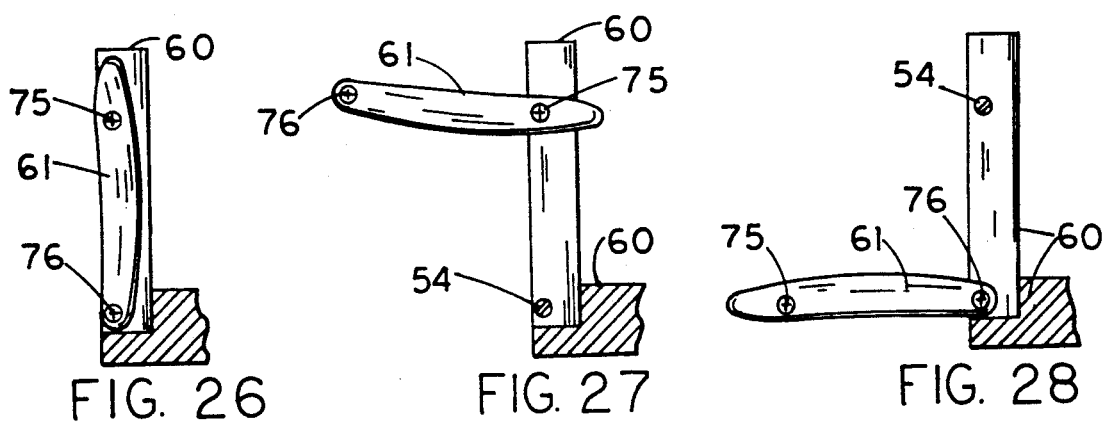

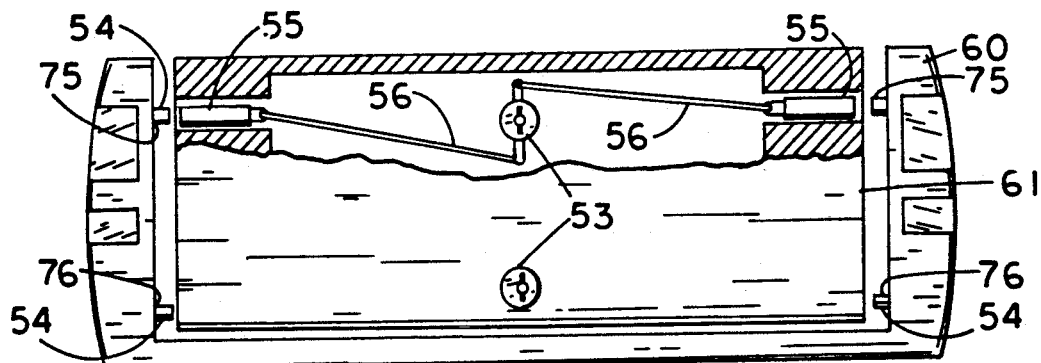
FIG. 22
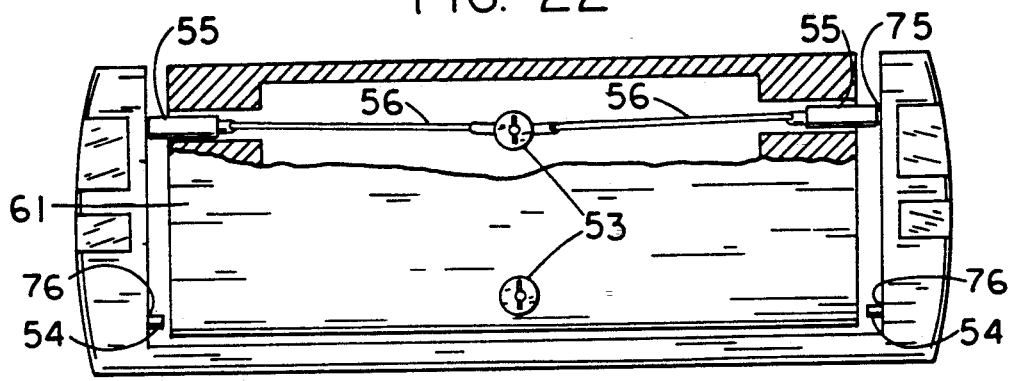
FIG. 23
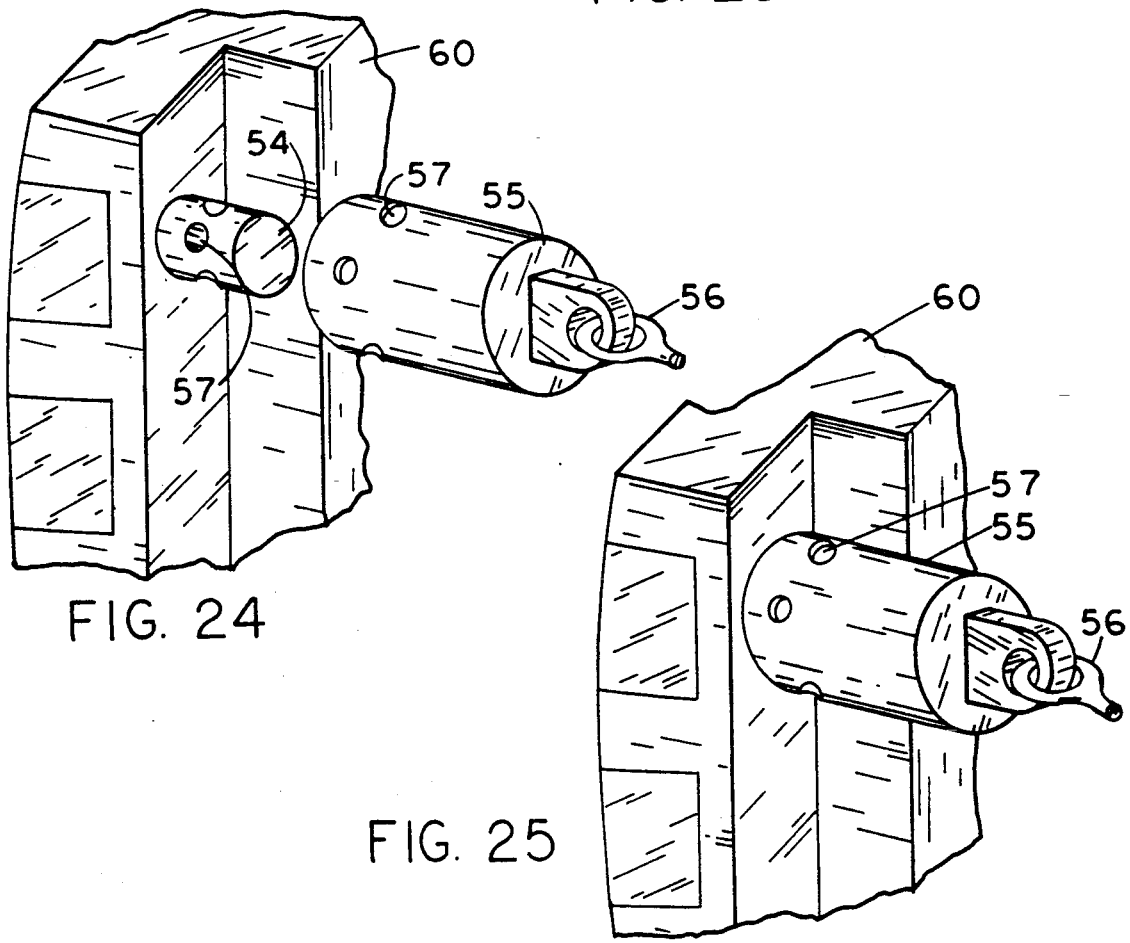
FIG. 24
FIG. 25

5,324,092

FLYING TAILGATE FOR PICKUP TRUCKS

BACKGROUND OF THE INVENTION

Pickup trucks come equipped with a tailgate that keeps the contents of the truck bed from falling out. This tailgate, since it is a wall-like air dam when in its normal up position, has a very high aerodynamic drag. A means to reduce the tailgate air drag is available in the form of a net that is installed after removal of the tailgate. Commercially available versions of this net have rectangular openings and rather wide rectangular net members so they still have a noticeable air drag. Further, they cannot be closed completely so small articles, sand, etc. can still escape out the back of the truck bed.

There is no means to control the air flow or to obtain a positive or negative lifting force from the standard pickup truck tailgate. My instant invention offers a tailgate with rotatable attachments. The instant inventive tailgate offers minimum aerodynamic drag and a means to generate a positive or negative lifting force. It can also be locked in a closed position so that hauling of small articles, sand, etc. can be accomplished without loss of same from the truck bed. An optional version is powered by a drive motor that rotates and controls positioning of the tailgate. It is normally easily installed using existing truck tailgate fastening hardware. I refer to this invention as the Flying Tailgate or simply Flying Tail.

There is one attempt at using the standard truck tailgate to impose a downward force component on the rear end of a pickup truck. This is a unit called the "WING DING TAILGATE" that is trademarked and made by the H. E. Corporation or Aeronamics, Walnut Creek, Calif. 94596. They have advertised this product in *Sport Truck Magazine*. It is simply a set of brackets that mounts the standard truck tailgate above and proximal the rear of the bed of the pickup truck. There is another design, available from several manufacturers, that simply fixedly mounts a small rear spoiler above the rear part of the pickup bed. An example of this rear spoiler is shown in an advertisement in the January, 1993 issue of *MINITRUCKIN'* magazine. It is made by Street Effects, Desoto, Tex. As fixedly mounted, either the "WIND DING TAILGATE" or the rear spoiler is angled down at its forward end to provide a downward force on the rear of the pickup truck. However, neither is rotatable or adjustable and neither uses the standard tailgate attachment hardware that is affixed to the truck body. Further, they do not offer a motor drive for rotation power. As such, they offer little resemblance to the instant invention.

SUMMARY OF THE INVENTION

With the foregoing in mind, it is the principal object of the present invention to offer a simple yet attractive new tailgate for pickup trucks that offers minimum aerodynamic drag.

It is a related object of the invention that it can be locked in position to insure minimum aerodynamic drag.

it is a further object of the invention that it can be fixed in position to provide an aft seal or vertical tailgate for the truck bed.

A related object of the invention is that a locking mechanism can be provided for fixing the position of the instant inventive flying tailgate.

Another object of the invention is that it can automatically assume a closed or vertical position when the pickup truck is stopped and then opens up as the pickup truck accelerates to high speed.

It is a related object of the invention that a torque spring, or other force biasing mechanism, can be provided to aid the instant inventive flying tailgate's rotation.

It is a further object of the instant invention that it can be attached using existing pickup truck tailgate attachment hardware.

It is a related object of the invention that it can be removed quickly and easily, without special tools in the preferred embodiment, and that the original truck's tailgate can be easily reinstalled.

It is another object of the invention that a restraining grille can be used in conjunction with it.

Yet another object of the invention is that more than one vane can be used in a tailgate if desired.

It is an object of the invention that multiple vanes can be attached by linkage or other means if desired.

It is also an object of the invention that it can be made to hinge at the bottom so that it can be rotated up and down much like a standard pickup truck tailgate.

It is a further object of the invention that a motor can be used to rotate a vane if desired.

It is another important object of the invention is that it can be positioned so as to accomplish a vertical force on the pickup truck.

The invention will be better understood upon reference to the drawings and detailed description of the invention which follow in which:

BRIEF DESCRIPTION OF THE DRAWINGS

FIG. 3 is an isometric view of the preferred single vane version of the instant invention.

FIG. 4 presents a side view, as seen from line 4—4 of FIG. 3, that shows a low drag symmetrical airfoil vane shape.

FIG. 5 is another side view, taken from line 5—5 of FIG. 3, of a very simple flat plate version of the vane.

FIG. 6 shows a side view, as viewed from line 6—6 of FIG. 3, that shows a minimum drag airfoil or wing-like shape vane that has variable camber to effect a lifting force on the aft end of the vane.

FIG. 7 presents yet another version of the vane, as seen from line 7—7 of FIG. 3, that is designed to provide a downward force on the back end of the pickup truck to add to truck stability at high speeds.

FIG. 8 shows a vane locked in the vertical position when the pickup truck is operating at high speeds. Note the air turbulence around the front of the vane. This is a similar situation as occurs in a standard pickup truck tailgate.

FIG. 9 shows an unrestrained vane that is rotating toward a horizontal position as the pickup truck accelerates.

FIG. 10 is the same situation as FIG. 9 but with the pickup truck at higher speeds.

FIG. 11 shows the vane at its high speed near horizontal position which affords minimum aerodynamic drag.

FIG. 12 presents one of the more common pickup truck tailgate fastening hardware systems.

FIG. 13 presents another one of the more common pickup truck tailgate fastening hardware.

FIG. 14 shows a means to fasten the vane to the tailgate fastening hardware of FIG. 12. It also shows a way to lock the vane in vertical or horizontal positions.

FIG. 15 presents the same attachment means as FIG. 14 but with the vane unlocked and free to rotate. Note the optional torque spring that may be used to assist rotation of the vane.

FIG. 16 shows the adapter plate/pin used in FIGS. 14 and 15.

FIG. 17 presents an optional motor drive for the vane as attached in a similar manner to that shown in FIGS. 14 and 15.

FIG. 18 illustrates a means to attach the vane to rectangular pickup truck tailgate attachment hardware as was shown in FIG. 13. It is unattached and being installed in this instance.

FIG. 19 shows the same attachment means as was presented in FIG. 13 but with the attachment complete and locked in position.

FIG. 20 is an isometric view of the attachment cylinder/lock used in the vane attachment means used in FIGS. 18 and 19.

FIG. 21 presents an adapter plate to be used with the pickup truck attachment hardware of FIG. 12 to make it usable with the simple vane attachment means presented in FIGS. 18 and 19.

FIG. 22 presents a means of vane attachment, as seen in a rear view of a pickup truck, that allows vane attachment at either the top or bottom or both of the vane. FIG. 22 shows the vane in the installation position and ready for attachment.

FIG. 23 shows the same view as FIG. 22 but with the upper attachment secured as accomplished by rotation of the upper center latch shown.

FIG. 24 illustrates the attachment hardware in the unattached position as was the case for FIG. 22.

FIG. 25 shows the attachment hardware in the attached position as FIG. 23. Note the locking pin holes in the attachment hardware for locking the vane in a given position.

FIG. 26 is a side view of the vane of FIGS. 22 and 23 with attachment at both top and bottom of the vane. This presents the same situation as occurs when a standard pickup truck tailgate is vertical and secured.

FIG. 27 presents the same view as FIG. 26 but with only the upper vane attachment secured.

FIG. 28 is also the same view as FIG. 26 except that only the bottom vane attachment is secured. Note that the vane is functioning as a standard pickup tailgate when open in this instance.

DETAILED DESCRIPTION

With reference to each of the aforementioned figures in turn, and using like numerals to designate similar parts throughout the several views, a preferred embodiment and several alternative embodiments will not be described.

Figure 1:
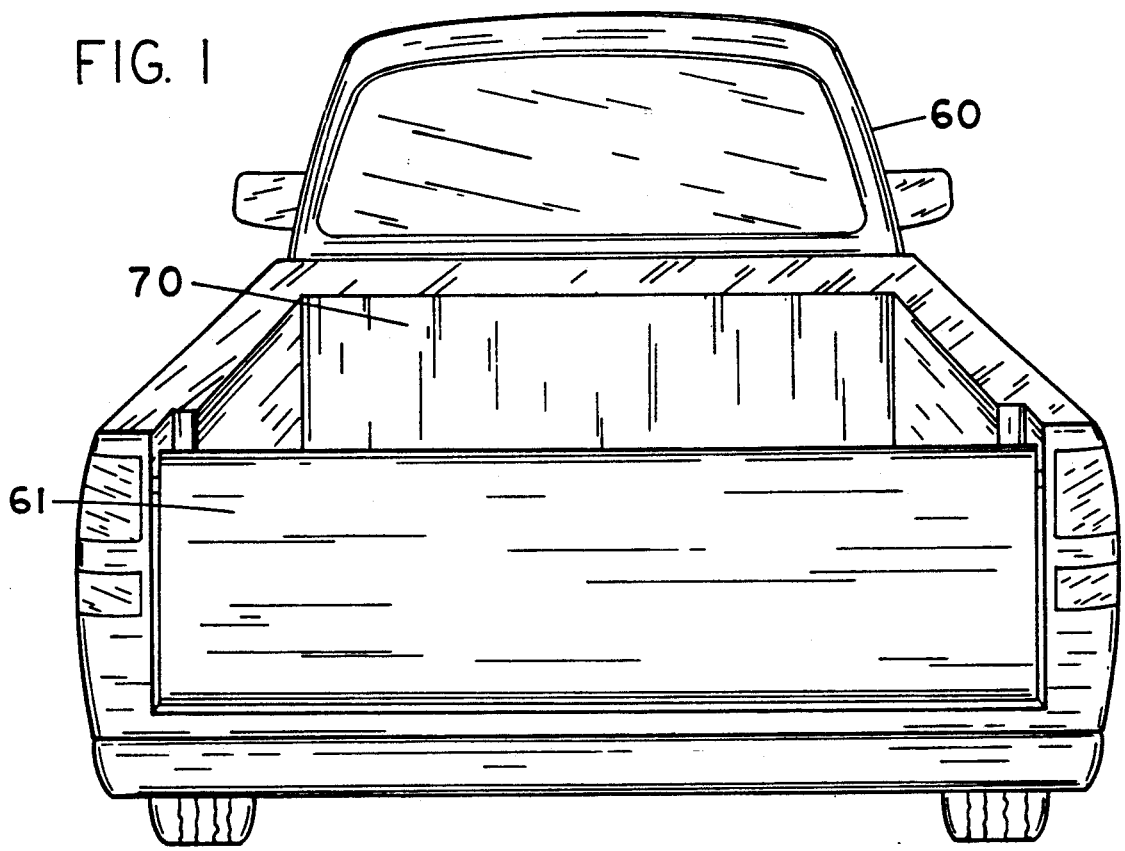
FIG. 1 presents a rear view of a pickup truck with the inventive flying tailgate in the stopped or at rest position.

FIG. 1 presents an isometric rear view of a pickup truck 60 with a single flying tailgate vane 61 installed. In this instance the truck 60 is at rest with the vane 61 upright so the appearance is similar to a standard pickup tailgate when it is upright to prevent loss of material from the truck bed 70.

Figure 2:
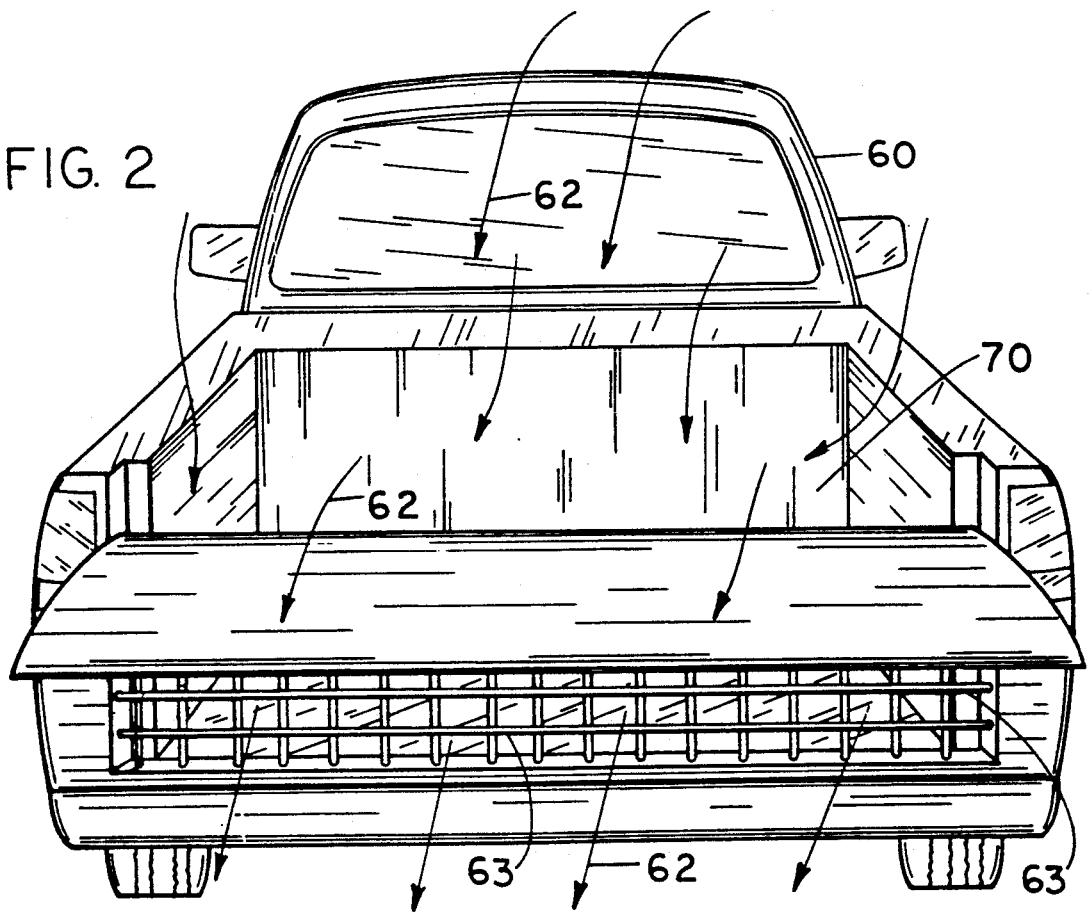
FIG. 2 shows the same pickup truck with the inventive flying tailgate in its near horizontal position as occurs at high vehicle speeds.

FIG. 2 is the same view as FIG. 1 but with the pickup truck 60 at high speed and the vane 61 proximal horizontal. Proximal horizontal is intended to mean that the longitudinal centerline of the vane 61 is more horizontal than vertical for purposes of the instant invention. Air flow arrows 63 show the path of air over and under the vane 61. Note also the grille 63 used to restrict the passage of small objects from the truck bed 70. Note also that a definition of high speed for the pickup truck is meant to be a speed of over twenty five miles per hour for purposes of this invention.

FIG. 3 is an isometric view of the vane 61 showing air flow arrows 62 and pivot hole 64 and upper attachment point 75 in the vane 61.

FIG. 4 is a view, as taken from line 4—4 of FIG. 3, that shows a vane 61 that is symmetrical about its longitudinal centerline 71. This is normally considered to be the lowest aerodynamic drag design.

FIG. 5 is the same view as presented in FIG. 4 but of a simpler but higher aerodynamic drag vane shape.

FIG. 6 is the same view as given in FIG. 4 but with a variable camber vane 61. This design has low drag coupled with a lifting force that can be helpful in raising the vane 61 during acceleration.

FIG. 7 is also the same view as presented in FIG. 4 but of a vane 61 that has variable camber such that it will have a downward force on the pickup truck. The force component is represented by force arrow 72. Note that the pivot point, as indicated by upper attachment 75, is further aft in this vane 61. That is to allow the downward force component 72 to be transmitted to the pickup truck better. Also, the vane 61 would normally be locked in the position shown to accomplish the downward force on the pickup truck. This arrangement adds a substantial advantage to the operation of the pickup truck since pickup trucks, when not carrying a load in their beds, are generally too light in the rear for good handling.

FIGS. 8, 9, 10, and 11 show a vane 61 going from the vertical at rest position to the near horizontal high speed position as influenced by acceleration and air forces. Air flow arrows 62 give an idea of the air flow directions. Note that FIG. 8 also illustrates the situation that occurs for a vertically locked tailgate.

FIG. 12 shows one of the more common standard tailgate upper fastening means as used in new pickup trucks 60. For example, these cylindrical attachments 65 are used on the newer Ford 150 series, Dodge mid-size, and Mazda pickups.

FIG. 13 illustrates another common standard tailgate upper fastening means. Examples of the use of these rectangular attachments 66 with rectangular hole 58 can be found in the newer GMC, Ford Ranger, and Toyota pickups. The tailgate attachment means, or minor variations, shown in FIGS. 12 and 13 cover the vast majority of those used in modern pickup trucks.

FIG. 14 shows a means of attachment, as taken through line 14—14 of FIG. 4, of a vane 61 to the cylindrical attachments 65 illustrated in FIG. 12. This is a partial cutaway view, as taken from a centerline of a vane pivot hole 64, that shows an adapter bracket 48, fasteners 51, and optional torque spring 67. Note the vane lock 41 that is positioned in locking holes 57 in this instance. This locking capability is valuable in that it allows locking of the vane 61 in either horizontal, vertical, other orientations. Note that it is an intent of this invention that a simpler version of the flying tail can realized by simply attaching it fixedly in the horizontal or flying position.

FIG. 15 is the same view as presented in FIG. 14 but with the vane lock 41 unlocked and the vane 61 free to rotate as indicated by vane rotation arrow 40. The torque spring 67 force component is indicated by torque arrow 69. Note that the vane lock 41 and key 42 shown in FIGS. 14 and 15 is a standard item available from Southco, Inc., Concordville, Pa., so it is not shown in cross section.

FIG. 16 is an isometric view of the adapter bracket 48.

FIG. 17 is a similar view to that presented in FIGS. 14 and 15 except that a motor 46 is provided to control vane 61 rotational forces. The motor is fastened to a motor adapter bracket 73 by fasteners 51. Motor control and drive wires 72 and shaft and drive key 47 are also shown. Note that other powered vane drive means than the electric drive motor 46 shown, such as pneumatic actuators, etc., can be utilized.

FIG. 18 is a view, taken through line 18—18 of FIG. 4, that shows a means to attach the vane 61 to the rectangular attachments 66 that were illustrated earlier in FIG. 13. In this simple attachment system a floating cylinder 50 is inserted into the vane pivot hole 64. It is preferably resiliently biased outward by compression spring 68. As shown, the floating cylinder 50 is in the released or withdrawn position where its male rectangular latch 59 is not in engagement with the rectangular latch hole 64 of rectangular attachment 66.

FIG. 19 is the same view as that presented in FIG. 18 but with the floating cylinder 50 in the inserted and locked position. Note that one of the locks 41 is locked in this case to prevent withdrawal of the floating cylinder 50. The other lock 41 is shown unlocked which allows the vane 61 to rotate freely as is indicted by rotation arrow 40.

FIG. 20 is an isometric view of the floating cylinder 50 used in the attachment system presented in FIGS. 18 and 19.

FIG. 21 shows an adapter plate 49 that can be used to allow the simple attachment system of FIGS. 18 and 19 to be utilized with the cylindrical pickup attachments that were shown in FIG. 12.

FIG. 22 presents a rear and partial cutaway view of another means of attachment for the instant invention vane 61 to a pickup truck 60. This means of attachment preferably utilizes cylindrical male fasteners 54 fixed to the pickup truck 60 and positioned proximal the top and bottom of both sides of the vane 61. Mating cylindrically hollowed out or female fasteners 55 are positioned in the vane 61. A latch 53, such as commercially available from Southco, Inc., is used to slide the female fasteners 55 over the male fasteners 54, by means of linkages 56, and then lock them together. This provides for a simple flying tailgate vane 61 that can be easily attached at the top and/or bottom in seconds. It provides for hinging at the bottom for easy loading and unloading of the pickup truck bed while still providing for a vane 61 that can rotate freely or be locked in the top position.

As shown in FIG. 22, the flying tailgate vane 61 is in the unlatched condition and ready for installation. Only the upper workings of the latching system are shown for illustration; however, the bottom latch system is the same. FIG. 22 shows both upper attachments 75 and lower attachments 76. Note that other variations of this concept, including other shapes and types of latches, attachment systems, and the like are possible. However, to show the numerous possible means of latching the flying tailgate vane 61 would be virtually impossible and is not considered essential to the function or purpose of this invention.

FIG. 23 is the same view as presented in FIG. 22 but with the upper latching system in place. The female fasteners 55 are in place over the male fasteners 54. The lower latching system is still unlatched in this FIG. 23.

FIG. 24 is an isometric view showing the details of a female fastener 55 and male fastener 54 in the uncoupled condition. Note the locking pin holes 57 in both fasteners that can be used if it is desirable to lock the vane from rotating.

FIG. 25 is the same isometric view as presented in FIG. 24 but with the female fastener 55 coupled and in place. Note the locking holes 57. A locking pin member is not shown here to simplify the drawing; however, it would preferably be a similar lock to that shown in earlier FIGS. 14 and 15 as lock 41 and key 42.

FIGS. 26, 27, and 28 show the vane 61 of FIGS. 22 and 23 in different orientations. FIG. 26 shows both top and bottom latching system engaged, FIG. 27 shows only the top latching system engaged, and FIG. 28 shows only the bottom latching system engaged. It can be seen that FIGS. 26 and 28 are the common up and down positions for a standard pickup truck tailgate. Therefore, this attachment system for the flying tailgate offers all of the features of the standard tailgate along with the significant advantages of the flying tailgate. It is therefore considered to be the preferred embodiment of the instant invention.

Note that the upper attachment 75, is normally considered to be an upper attachment for purposes of the instant invention even though it may be near or even aft of a mid-span position on the vane as can be seen on earlier FIG. 7. A lower attachment 76 is generally considered to be an attachment provided for hinging of the vane as a standard tailgate as is shown in FIG. 28.

Figure 29:
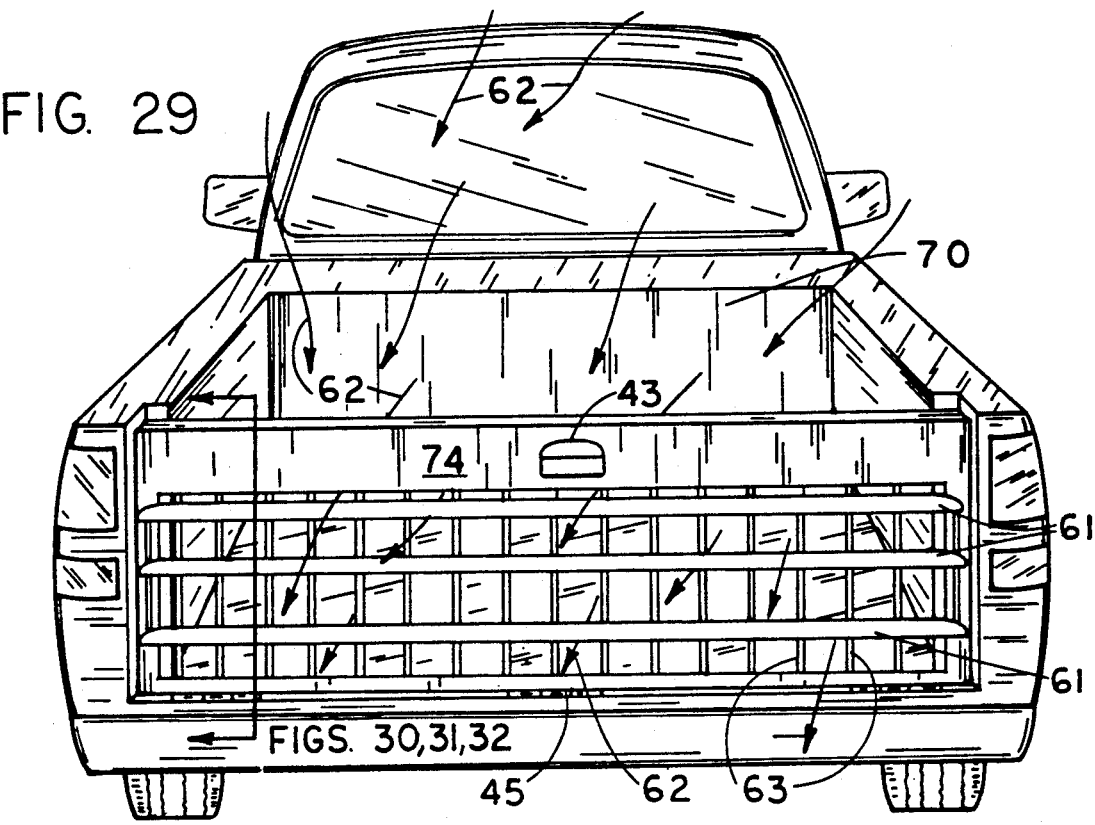
FIG. 29 presents the rear view of a pickup truck operating at high speeds with a variation of the instant invention that uses a hinged tailgate frame around one or more vanes. It has multiple vanes in this instance; however, a single vane could be used.

FIG. 29 is a rear isometric view of a pickup truck with a multi-vane version of the instant invention. The vanes 61 are shown in the high speed or near horizontal orientation. This flying tailgate vane system is shown installed in a cutout tailgate 74. It has a tailgate latch or handle 43 and a bottom hinge 45 the same as most all of the present day pickup truck tailgates have.

Figures 30, 31:
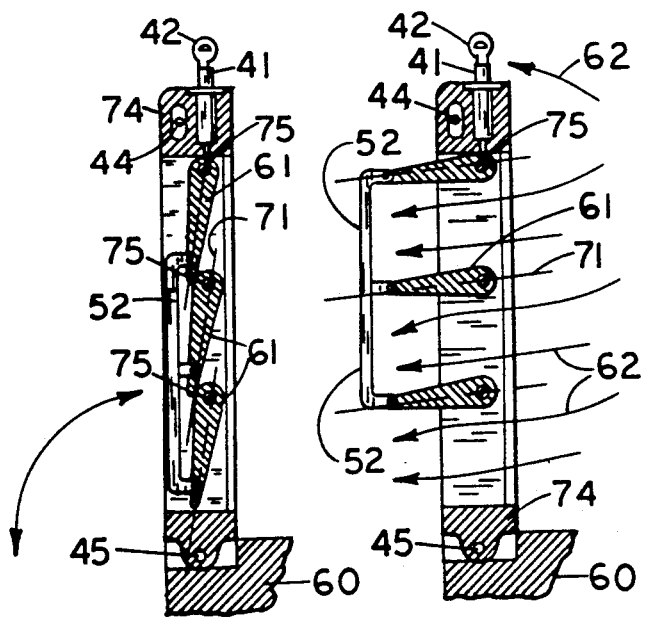
FIG. 30 shows a partial cross-sectional view, as taken from line 30—30 of FIG. 29, that shows the vanes in the at rest or closed position.
FIG. 31 is a partial cross-sectional view, as seen from line 31—31 of FIG. 29, that shows the vanes in the fully open and minimum aerodynamic drag condition.

FIG. 30 is a cross-sectional view, as taken through line 30—30 of FIG. 29, that shows the vanes 61 in the at rest position. The vanes are preferably linked by vane linkage rods 52 so that their movement will be in unison. A vane locking push-in lock 41 and key and a center latch linkage rod 44 are also shown.

FIG. 31 is the same view as presented in FIG. 30 but with the vanes 61 in the near horizontal and therefore low air flow resistance orientation.

Figure 32:
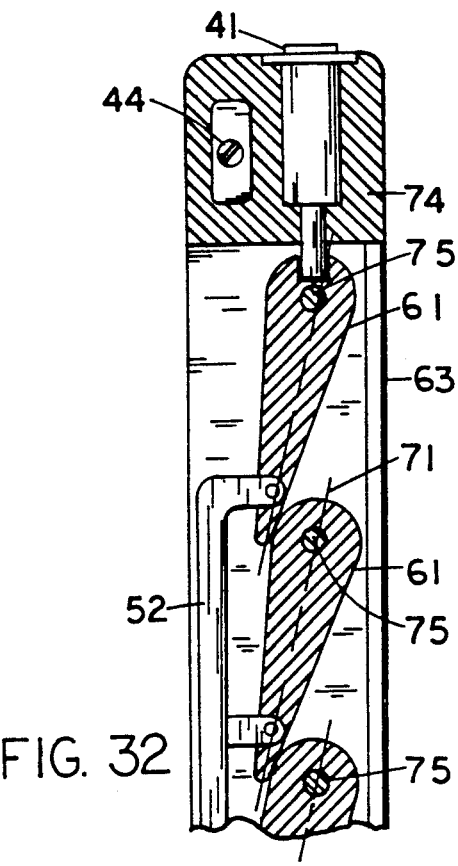
FIG. 32 is an enlarged view of a portion of FIG. 30 but with the vanes locked by means of a locking mechanism and linkages between the vanes.

FIG. 32 is an exploded view of a portion of view presented in FIG. 31 but with the vane locking push-in lock 41 in the extended or locked position. Note that the vane linkage rods 52 insure that all vanes 61 are locked securely. This makes for a secured tailgate that will prevent loss of small articles, sand, and the like out the back of the truck bed.

While the invention has been described in connection with a preferred and several alternative embodiments, it will be understood that there is no intention to thereby limit the invention. On the contrary, there is intended to be covered all alternatives, modifications and equivalents as may be included within the sprit and scope of the invention as defined by the appended claims, which are the sole definition of the invention.

What I claim is:

1. In an improved tailgate for a pickup truck, said improved tailgate in mechanical communication with attachment means for attaching the improved tailgate to the pickup truck, the improvement comprising:

said attachment means comprising an upper rotatable attachment with said upper rotatable attachment lockable in a fixed position whereby the improved tailgate can be fixed in relationship to the pickup truck such that the improved tailgate's longitudinal centerline is more horizontal than vertical, and means to resiliently bias rotation of the improved tailgate.

2. The improved tailgate of claim 1 wherein the attachment means comprise, at least in part, attachment hardware that is supplied as original equipment with the pickup truck.

3. The improved tailgate of claim 1 which further comprises a lock to allow locking of the improved tailgate such that its longitudinal centerline is in a more horizontal than vertical orientation when the improved tailgate is attached by its upper attachment.

4. The improved tailgate of claim 1 which further comprises powered means for positioning of said tailgate when the tailgate is attached by its upper attachment.

5. The improved tailgate of claim 1 which further comprises a grille to prevent loss of small objects from a bed of the pickup truck when the improved tailgate is attached by its upper attachment and oriented such that its longitudinal centerline is more horizontal than vertical.

6. The improved tailgate of claim 1 wherein said improved tailgate is, at least partially, shaped like an airfoil vane.

7. The improved tailgate of claim 6 wherein said airfoil vane generates a downward force component when it is attached by its upper attachment and locked in position with its longitudinal centerline plane more horizontal than vertical and the pickup truck is traveling forward at high speed.

8. In an improved tailgate for a pickup truck, said improved tailgate in mechanical communication with attachment means for attaching the improved tailgate to the pickup truck, the improvement comprising:

said attachment means comprising an upper rotatable attachment with said upper rotatable attachment lockable in a fixed position whereby the improved tailgate can be fixed in relationship to the pickup truck such that the improved tailgate's longitudinal centerline is more horizontal than vertical, said improved tailgate is, at least partially, shaped like an airfoil vane, and said airfoil vane generates a downward force component when it is attached by its upper attachment and locked in position with its longitudinal centerline plane more horizontal than vertical and the pickup truck is traveling forward at high speeds 9. The improved tailgate of claim 8 wherein the attachment means comprise, at least in part, attachment hardware that is supplied as original equipment with the pickup truck.

10. The improved tailgate of claim 8 which further comprises means to resiliently bias rotation of the improved tailgate.

11. The improved tailgate of claim 8 which further comprises powered means for positioning of said improved tailgate.

12. The improved tailgate of claim 8 which further comprises a grille to prevent loss of small objects from a bed of the pickup truck when the improved tailgate is oriented such that its longitudinal centerline is more horizontal than vertical.

13. In an improved pickup truck, the improvement comprising:

a vane in mechanical communication with said pickup truck with said vane rotatably attached proximal an upper rear portion of a bed of said improved pickup truck, said vane rotated by means of a drive motor such that the vane can be rotated from vertical to an orientation that is more horizontal than vertical by said drive motor.

14. The improved pickup truck of claim 13 wherein said vane causes a vertical force component on the rear portion of the pickup truck when said vane's longitudinal centerline is more horizontal than vertical and the pickup truck is traveling forward at high speeds.

15. The improved pickup truck of claim 14 wherein said vane is, at least partially, shaped like an airfoil.

16. The improved pickup truck of claim 15 wherein said airfoil vane is cambered.

17. The improved pickup truck of claim 14 which further comprises a locking mechanism that, when locked, prevents removal of the vane from the pickup truck.

18. The improved pickup truck of claim 17 wherein said vane can be easily removed from the pickup truck when the lock is unlocked.

19. The improved pickup truck of claim 13 wherein said vane is, at least in part, attached to the pickup truck by tailgate attachment means supplied with the pickup truck as original equipment.

20. The improved tailgate of claim 1 which further comprises a lower attachment with said upper and lower attachments separately detachable such that the improved tailgate can rotate separately from its upper and lower portions.

21. The improved tailgate of claim 9 which further comprises a lower attachment with said upper and lower attachments separately detachable such that the improved tailgate can rotate separately from its upper and lower portions.

22. In an improved tailgate for a pickup truck, said improved tailgate, after removal of a factory installed tailgate, in mechanical communication with attachment means for attaching the improved tailgate to the pickup truck, the improvement comprising:

said attachment means comprising an upper rotatable mechanism with said upper rotatable mechanism, at least in part, attached to the pickup truck using standard tailgate fastening means that are part of the pickup truck as supplied from the factory, with said standard tailgate fastening means having been part of an upper latching mechanism that was used to lock the factory installed tailgate in a vertical position.

23. The improved tailgate of claim 22 which further comprises a lock to allow locking of the improved tailgate such that its longitudinal centerline is in a more horizontal than vertical orientation when the improved tailgate is attached by the upper rotatable mechanism.

24. The improved tailgate of claim 22 which further comprises means to resiliently bias rotation of the improved tailgate about its upper rotatable mechanism.

25. The improved tailgate of claim 22 which further comprises powered means for positioning of said tailgate when the tailgate is attached by the upper rotatable mechanism.

26. The improved tailgate of claim 22 which further comprises a grille to prevent loss of small objects from a bed of the pickup truck when the improved tailgate is attached by its upper rotatable mechanism.

27. The improved tailgate of claim 22 wherein said improved tailgate is, at least partially, shaped like an airfoil vane.

* * * * *